P. Merkel.
Wheel Plow.
Nº 59,865.  Patented Nov. 20, 1866.
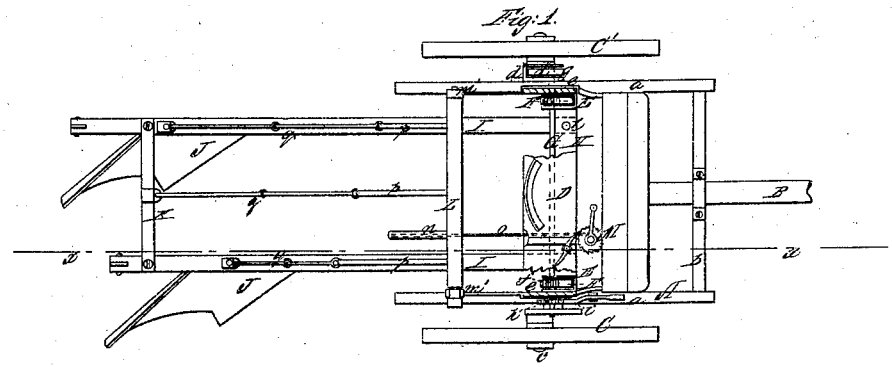
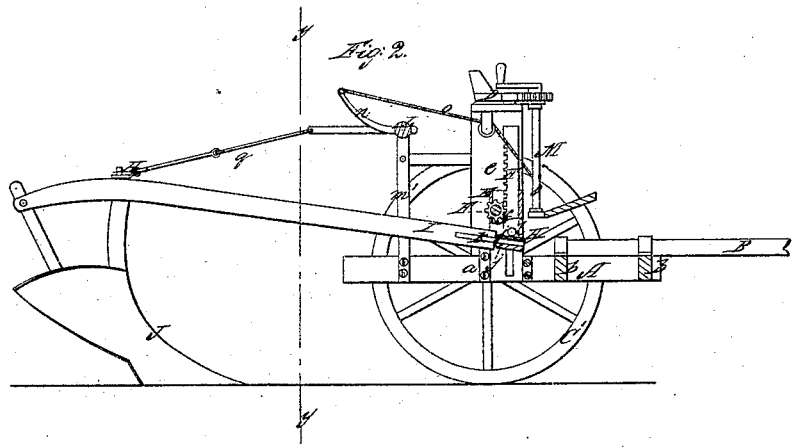
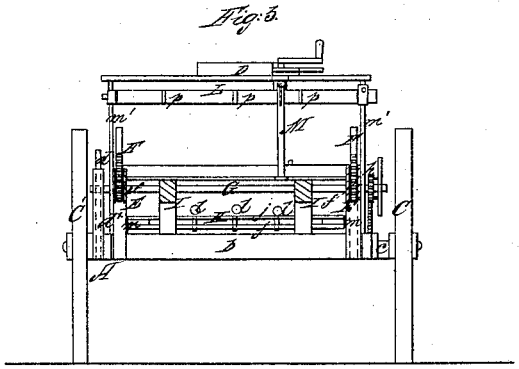
Witnesses:  Inventor:

United States Patent Office.

IMPROVEMENT IN GANG PLOUGHS.

PETER MERKEL, OF ST. LOUIS, MISSOURI.

Letters Patent No. 59,855, dated November 20, 1866.

SPECIFICATION.

TO ALL WHOM IT MAY CONCERN:

Be it known that I, PETER MERKEL, of St. Louis, in the county of St. Louis, and State of Missouri, have invented a new and improved Gang Plough, and I do hereby declare that the following is a full, clear, and exact description thereof, which will enable others skilled in the art to make and use the same, reference being had to the accompanying drawings forming part of this specification, in which—

Figure 1 is a plan or top view of my invention.

Figure 2, a side sectional view of the same, taken in the line $x\ x$, fig. 1.

Figure 3, a transverse vertical section of the same, taken in the line $y\ y$, fig. 2.

Similar letters of reference indicate like parts.

This invention relates to a new and improved arrangement of the plough-beams, whereby the ploughs may with the greatest facility be adjusted higher or lower, according to the depth of furrow required, and also readily elevated above the ground when not required to work, as, for instance, in turning at the ends of a field, or in drawing the machine from place to place; the invention, at the same time, admitting of the side-wheel which runs in the land or unploughed surface being adjusted higher or lower, as occasion may require.

A represents a frame composed of two side-bars, $a\ a$, connected by cross-bars $b\ b$, and having a draught-pole, B, attached centrally to it. This frame, A, is mounted on two wheels, C C', one of which, C, has its axle, $c$, permanently attached to one of the side-bars, $a$, and the other wheel, C', has its axle fitted to a slide, $d$, which is provided at its front edge with a rack, and works in a box, $d^*$, attached to the other side-bar, $a$, of the frame A, see figs. 1 and 3. The frame A has an upright, $e$, attached to each side of it, to support the driver's seat, D, and to the inner sides of the uprights $e\ e$, there are secured boxes, E E, in which rack-bars, F F, are fitted and allowed to work freely up and down. G is a horizontal shaft which passes through the uprights, $e\ e$, and has pinions, $f\ f$, upon it, which gear into the racks of the bars F, and said shaft also has a pinion $g$ upon it, which gears into the rack of slide $d$. This shaft G also has a ratchet $h$ upon it at one end, into which ratchet a pawl $i$ catches to retain the shaft G and hold the rack-bars F F, and slide $d$ at any desired point within the scope of their movement. H is a cross-piece composed of two parallel bars, $j\ j$, having a space between them to receive plates $k$ at the front ends of plough-beams I I, said plates being secured to the cross-piece by pins $l$, which pass through the cross-piece and the plates, see figs. 2 and 3. The ends of the cross-piece H are provided with journals $m$, which work loosely in the lower ends of the rack-bars F F, the inner sides of the boxes E E having vertical slots made in them to admit of the cross-piece H rising and falling. The plough-beams, I I, have ploughs, J, attached to them, and the rear parts of the beams are connected by a cross-bar K. L is a shaft which has its bearings in the upper ends of uprights $m'$, attached one to each side of the frame A, and this shaft has an arm, $n$, projecting from its rear side, said arm being connected by a strap or chain, $o$, with an upright windlass, M, at the front of the driver's seat, D. Arms $p$, three, more or less, also project from the rear of shaft L, and these arms are connected by links or chains, $q$, to the plough-beams and cross-bar K.

From the above description it will be seen that the driver on seat D may at any time raise the ploughs out of the ground, by turning the windlass M, and that the ploughs may be adjusted higher or lower, to suit the depth of furrow required, by raising or lowering the cross-piece H, which is done by turning the shaft G, the wheel C' being also adjusted at the same time. By this simple arrangement it will be seen that the ploughs are placed under the complete control of the driver, and there are no parts liable to become deranged by use, or to get out of repair.

Having thus described my invention, I claim as new, and desire to secure by Letters Patent—

1. The combination of the windlass M, shaft L, with its arm $n$ and $p$, links $q$, and plough-beams I, substantially as described, for the purpose specified.

2. The adjusting of the ploughs J higher or lower, to suit the depth of furrow required, and also adjusting the wheel C', by means of the shaft G, provided with the pinions $f\ f\ g$, and the rack-bars F F, and slide $d$, provided with a rack, substantially as and for the purpose set forth.

3. The fitting and securing of the front ends of the plough-beams I I, in a cross-piece H, composed of two parallel bars, $j\ j$, provided with journals $m$, fitted in the rack-bars F, substantially as and for the purpose specified.

PETER MERKEL.

Witnesses:
ADOLPH GRASEY,
V. GLUCZ.